US007228066B2

(12) United States Patent
Pope (10) Patent No.: US 7,228,066 B2
(45) Date of Patent: Jun. 5, 2007

(54) VARIABLE FLOW SPRAY SYSTEM (75) Inventor: Randy D. Pope, Edinburg, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 209 days.

(21) Appl. No.: 10/476,445

(22) PCT Filed: Apr. 30, 2002

(86) PCT No.: PCT/US02/13764

§ 371 (c)(1),
(2), (4) Date: May 18, 2004

(87) PCT Pub. No.: WO02/087399

PCT Pub. Date: Nov. 7, 2002

(65) Prior Publication Data
US 2004/0194631 A1    Oct. 7, 2004

(51) Int. Cl.
A47J 27/00    (2006.01)
(52) U.S. Cl. ............... 392/441; 392/451; 422/106; 99/279; 99/280; 99/285; 99/289 R; 99/323.3
(58) Field of Classification Search ......... 422/106; 99/279, 280, 285, 289 R, 323.3
See application file for complete search history.

(56) References Cited

U.S. PATENT DOCUMENTS

| 3,085,880 A | 4/1963 | Matty ............... 99/71 |
| 3,490,356 A | 1/1970 | Peterson ............. 99/300 |
| 3,626,839 A | 12/1971 | Martin et al. .......... 99/315 |
| 4,823,685 A * | 4/1989 | Boumans et al. ........ 99/287 |
| 4,882,983 A | 11/1989 | Pastrick ............. 99/295 |
| 4,920,869 A | 5/1990 | Landais ............. 99/283 |
| RE34,482 E | 12/1993 | Pastrick ............. 99/295 |
| 5,477,775 A | 12/1995 | Delhom et al. ........ 99/299 |
| 5,647,055 A * | 7/1997 | Knepler ............. 392/451 |
| 5,901,635 A | 5/1999 | Lucas et al. ......... 99/283 |
| 5,957,035 A | 9/1999 | Richter ............. 99/287 |
| 6,003,435 A | 12/1999 | Patel ................ 99/283 |
| 6,148,717 A | 11/2000 | Lassota ............. 99/283 |

* cited by examiner

Primary Examiner—Glenn Caldarola
Assistant Examiner—Alexis Wachtel
(74) Attorney, Agent, or Firm—Barnes & Thornburg LLP (57) ABSTRACT An improved method and apparatus for brewing a brewing substance. The apparatus including a liquid conduit (18) for supplying a brewing liquid, a liquid permeable container (28) for retaining the brewing substance and allowing the brewed liquid to pass through, a spray member (20) for delivering the brewing liquid from the liquid conduit to a brewing substance and discharging the brewing liquid into the liquid permeable container, a liquid flow modifier (52) for varying the flow rate of liquid at the spray member, and a control member (44) operably connected to the liquid flow modifying member for causing the liquid flow modifying member to vary the liquid flow rate. The alteration of the discharge of the liquid from at least a first spray pattern to at least a second spray pattern facilitating mixing of the brewing liquid and brewing substance within the liquid permeable container.

33 Claims, 6 Drawing Sheets

VARIABLE FLOW SPRAY SYSTEM

BACKGROUND

The present disclosure relates to a beverage brewing apparatus and more particularly to systems and apparatus for brewing beverages.

A variety of brewing apparatus are available which employ a device for dispensing heated water over a quantity of beverage brewing substance. The beverage brewing substance is typically retained in a filter portion of a funnel. The filter portion allows a beverage to be drained from the beverage brewing substance infused with the heated water.

A variety of devices, for example, coffee brewers, perform the beverage brewing function as described herein above. Such brewers use a spray head to dispense or shower water in a spray pattern over the beverage brewing substance retained within the filter in the funnel. One aspect of the spray head that might be considered a problem is that the spray head typically produces a spray pattern. The spray pattern tends to concentrate the shower of water or wet only specific areas of the beverage brewing substance. If the spent coffee grounds in the funnel is inspected at the end of a beverage brewing cycle, one can see the spray pattern in the spent grounds. In other words, once all of the liquid has drained from the beverage brewing substance at the end of a brew cycle a spray pattern can be seen in the spent beverage brewing substance.

One of the problems that is encountered with such a spray head is that the saturation and infusion of the ground coffee may be inconsistent. The inconsistency results from the spray head producing a series of streams which are emitted through holes in the spray head. The streams tend to spray on a specific area of the beverage brewing substance. As a result, the area impacted by a specific stream may tend to be over saturated whereas the area spaced away from the impact point of the stream may be under saturated. As a result, the area that is over saturated may also result in over extraction from the beverage brewing substance. Similarly, the area which is under saturated will tend to result in an under extraction from such areas. While the amount of beverage brewing substance can be adjusted for a given quantity of beverage to be brewed, it would be desirable to optimize the extraction from all areas of the beverage brewing substance within the funnel.

Some prior art devices have attempted to overcome this extraction problem. For example, U.S. Pat. No. 5,957,035 employs a device for rotating the funnel about a central axis in order to attempt to cause the beverage brewing substance to move within the funnel. As such, this device tries to equalize the saturation of the beverage brewing substance within the funnel. One of the problems with this device is that it tends to be rather complicated and employs additional controllable and moving parts. For example, some form of driver must be provided in order to rotate the funnel. Such a driver may become contaminated with beverage brewing substance, water or residue from the brewing process. Additionally, since it is at the user interface, the funnel is engaged with the brewer by the user and may become damaged through wear and use.

The prior art devices tend to deliver heated water to the beverage brewing substance to saturate the beverage brewing substance. During the brewing cycle the beverage brewing substance floats within the funnel and the water drains therethrough. In other words, the beverage brewing substance particles or grounds are saturated with water and the resultant beverage brewing substance including the soluble particles and flavor characteristics are rinsed from the cell structure of the beverage brewing substance.

The prior art may not optimize the rinsing of the flavor characteristics from the cell structure of the beverage brewing substance since the grounds typically float up and down and are not agitated.

The present disclosure embodies a system and apparatus for causing a variable flow from the spray head to more evenly saturate the beverage brewing substance. Generally, the spray pattern produced by the spray head is fixed. In other words, the spray head is provided with a number of holes through which water is emitted. The pattern of these holes generally is not alterable during a brewing cycle. Also, generally, the flow rate is fixed. In other words, the rate at which water flows through the given diameter of the tubing connecting a reservoir to the spray head is fixed. Further, the flow rate of water into the reservoir which is used to displace water for use in the brewing process is also generally fixed. In other words, the line pressure feeding the reservoir and diameter of the conduits connected to the reservoir are fixed.

The present disclosure causes the spray pattern and flow to vary or pulse the water which results in penetrating the beverage brewing substance over a larger area. The disclosure tends to agitate or move the beverage brewing substance within the floating mass to create a more even saturation of the beverage brewing substance. As a result, a more consistent brewed product may be produced. One of the primary goals in brewing is to obtain a uniform extraction from the brewing substance. The present invention helps to maintain, optimize and provide reproducible beverage brewing.

As such, the present disclosure provides an apparatus and system for optimizing a desired extraction of brewed beverage from a beverage brewing substance.

The present disclosure also obtains a homogeneous, generally even extraction of solubles from the beverage brewing substance and therefore provides greater uniformity of desired flavor characteristics.

The present disclosure also avoids over extraction of some portions of the beverage brewing substance and under extraction in other portions of the beverage brewing substance within a given funnel during a given brewing cycle.

As such, it would be desirable to provide a system which would allow for the movement or agitation of the beverage brewing substance within the funnel without providing any control or operating elements at the user interface.

DETAILED DESCRIPTION OF THE ILLUSTRATED EMBODIMENT

Figure 1:
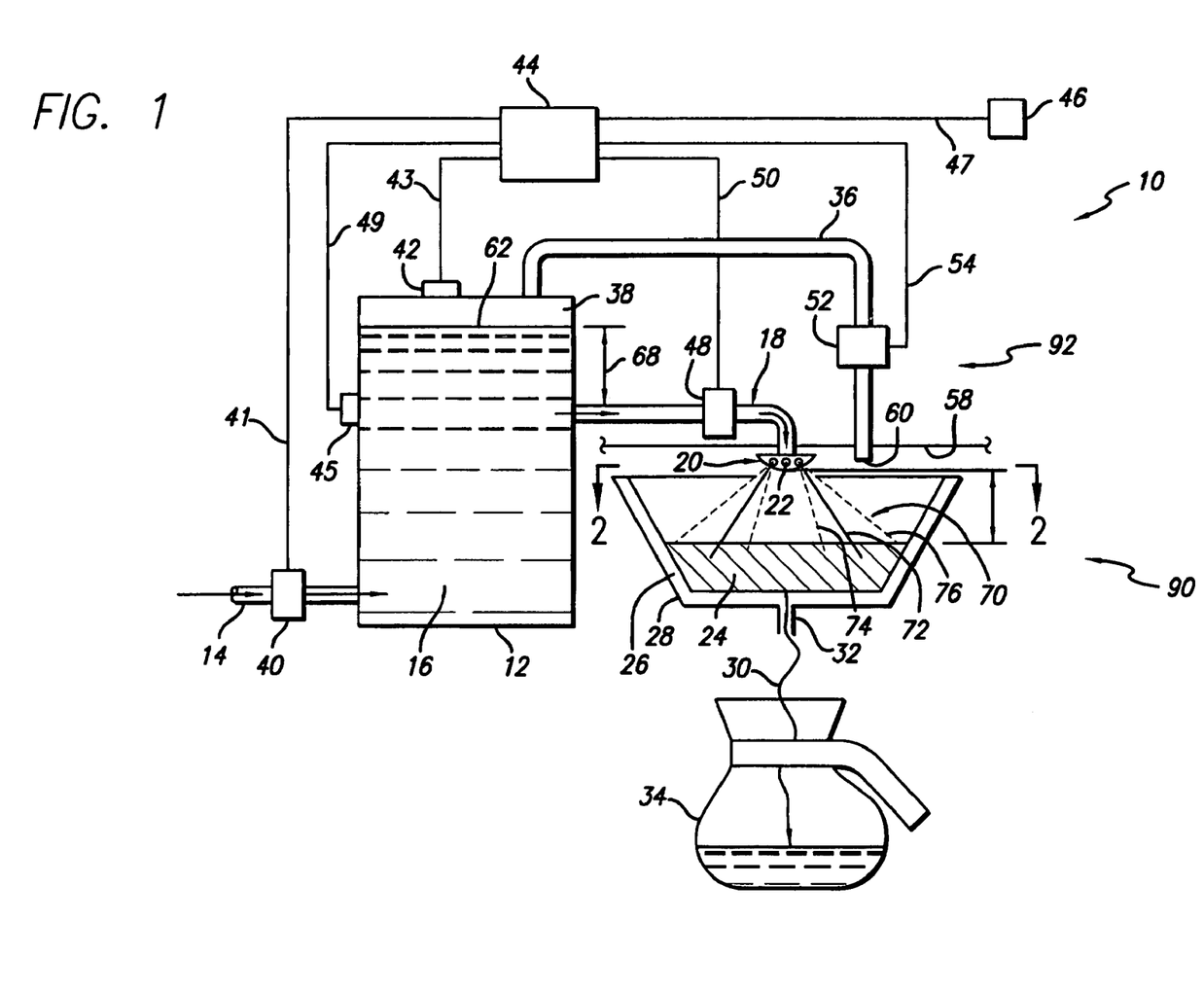
FIG. 1 is a partial fragmentary, diagrammatic illustration of a beverage brewing substance of the present disclosure.

The present disclosure is generally shown in the diagrammatic representation of FIG. 1 a beverage brewing apparatus or system 10. The beverage brewing apparatus 10 includes a heated water reservoir 12 which is connected to an water inlet feed line 14. The beverage brewing apparatus 10 dispenses heated water 16 from the reservoir 12 through an outlet line 18. The outlet line 18 includes a spray head 20 on the end thereof which produces a shower or spray of water therefrom in a pattern as determined by a plurality of openings 22 formed in the spray head wall. The water is delivered to a beverage brewing substance 24 retained within a filter 26 contained within a brewing funnel 28. During a brewing cycle, heated water 16 is dispensed onto the beverage brewing substance 24 (herein referred to as "coffee" or "grounds") thereby saturating the coffee. The terms "brewing," "brewed substance," "brewing liquid," or "brewed liquid" as used herein are broadly defined as including the brewing of coffee or tea as well as any process of infusion, steeping or passing a liquid (brewing liquid) through or mixing with a particulate substance (brewing material), for example, freeze dried coffee, to obtain a liquid containing soluble material from the particulate substance (brewed liquid). When brewing coffee, for example, a liquid beverage 30 is produced by the infusion process of the water saturating the coffee which flows from a drain hole 32 in the funnel 28. The brewed beverage 30 is dispensed into a carafe 34 positioned below the funnel 28.

The foregoing description of a beverage brewing apparatus 10 is similar to those commonly referred to as a displacement or pour-over brewing apparatus. Assignee of the present invention has produced numerous embodiments of such brewing apparatus. Such brewing apparatus may include a vent line 36 which communicates with the heated water reservoir 12 to vent the upper portion 38 of the reservoir 12 through the vent line 36 to atmosphere. Some existing devices position the vent line 36 to communicate with the funnel 28 in the event of an overflow through the vent line 36. In an overflow condition, water flowing through the vent line 36 would then be dispensed into the funnel 28.

As shown in the present disclosure, an inlet solenoid 40 is coupled to the inlet feed line 14 to controllably introduce and stop the flow of water from the feed line 14 into the reservoir 12. A water level probe 42 is positioned in a heated water reservoir 12 to detect a level of water 62 contained therein. The water level probe 42 will be described in greater detail and its function in relation to the overall system herein below. A controller 44 is provided to receive a signal from a water level probe 42 and to control the inlet solenoid 40. The inlet solenoid 40 is connected to the controller 44 over line 41. The probe 42 is connected to the controller 44 over line 43.

The controller 44 is coupled to at least one switch 46 which is used to initiate the brewing cycle. The brewing cycle initiating switch 46 may be in the form of a controllable switch such as a toggle switch or pressure sensitive switch. It is contemplated that other forms of controlling the start and stop of a brew cycle may be devised by one that is skilled in the art. The present invention is not limited by the type of switch employed. Also, a controllable solenoid 48 is coupled to the outlet line 18 so as to control the flow of water therethrough. The solenoid 48 is connected to the controller 44 over line 50.

The present invention also includes a controllable vent solenoid 52 which is connected to the controller 44 over line 54. The controllable solenoid 52 is normally open so as to provide the venting function of the vent line 36 communicating with the heated water reservoir 12. In the normally opened condition, the atmosphere in the upper portion 38 of the reservoir 12 can be vented through the vent line 36 and through the solenoid 52. The venting to the atmosphere equalizes the pressure in the heated water reservoir 12.

During operation of the beverage brewing apparatus 10, a filter 26 such as a disposable paper coffee filter is positioned in the funnel 28. A charge of beverage brewing substance 24 is positioned within the filter 26. The funnel is then positioned relative to the beverage brewing apparatus 10 generally removably attaching it to a housing portion 58 of the apparatus 10. The attachment of a funnel 28 to the housing 58 positions the funnel in a location generally, directly positioned below the spray head 20. Also, the funnel is positioned relative to an outlet 60 of the vent line 36.

When a brewing cycle is initiated, the switch 46 is activated thereby sending a signal over line 47 to the controller 44. The controller 44 will actuate the inlet solenoid 40 to allow water to flow through the inlet feed line 14 to the reservoir 12. The level sensing probe 42 detects the condition of a water level 62 in the reservoir 12. Also, the outlet solenoid 48 is opened by the controller 44 to allow heated water 16 to flow from the reservoir 12 through the outlet line 18 to the spray head 20. Generally, the outlet solenoid 48 remains open throughout the beverage brewing cycle.

The probe 42 works in conjunction with a conductive portion or coupling 45 which may be in the form of a specific point on the reservoir 12 or, in the event of a suitable metallic reservoir a conductive contact on the reservoir 12. The conductive point 45 contacts the water 16 so that a circuit may be completed between the probe 42 and the contact 45. When water 16 contacts the conductive probe 42, the circuit between the probe 42 and the contact 45 is completed. This condition indicates that a suitable level of water is in the reservoir. When the probe 42 no longer contacts water 16 in the reservoir 12 the circuit between the probe 42 and contact 45 is broken providing a signal to the controller that the water no longer contacts the probe 42.

The probe 42 and contact 45 do not detect the level of water but rather, merely detect the absence or presence of water at the probe 42.

The inlet feed line 14 is pressurized and as such provides water to the reservoir 12 when the inlet solenoid 40 is open. As water flows through the reservoir 12 through the outlet line 18 the water level 62 tends to lower. When the water 16 no longer contacts probe 42 the probe 42 sends a signal to the controller 44. The controller 44 then responds by opening the inlet solenoid 40 to allow water to enter the reservoir 12. As water enters reservoir 12 the level 62 tends to rise. When water contacts the probe 42 the inlet solenoid 40 is closed thereby ceasing the flow of water into the reservoir 12.

Through the opening and closing of the inlet solenoid 40 over a period of time identified as the brew cycle and through sensing the level of the water in the reservoir 12 the controller 44 can approximate the quantity or volume of water dispensed through outlet valve 48, through the outlet line 18 through the spray head 20. As a result, a desired volume of water can be dispensed from the reservoir 12 to the beverage brewing substance 24.

As noted above, the prior art systems tend to not optimize the extraction of coffee solids or flavor characteristics from a beverage brewing substance for coffee. The present invention employs the apparatus as described hereinabove as well as controlling the apparatus in a novel way in order to increase the controlled extraction of flavor solids from the ground coffee.

During a beverage brewing process the outlet solenoid 48 is opened. A volume of water 68 in the reservoir 12 above the outlet line 18 defines a head of water. When the outlet solenoid 48 is opened the head 68 tends to push water through the outlet line 18 under the force of gravity. As such, once the outlet solenoid 48 is opened water flows from the reservoir 12 through the outlet line 18. When the water 16 no longer contacts probe 42 the inlet solenoid 40 is opened thereby raising the level of water 62 in the reservoir 12. The beverage brewing cycle continues through the on and off cycle of the inlet solenoid 40 in response to the conductivity or lack of conductivity sensed at the probe 42. The outlet solenoid 48 generally stays open during the brew cycle.

During the brew cycle the apparatus and system of the present invention operatively controls a flow modifier 92 which, in the embodiment shown in FIG. 1, includes a solenoid vent valve 52 to control the spray pattern 70 emitted from the spray head 20. The purpose of the "vent valve" is to start, stop and/or regulate the flow of gas or air through the vent line 36 to control the pressure within the reservoir 12, outlet line 18, and spray head 20 which increases or decreases the flow rate at the spray head 20. The term "vent valve" as used herein may include a number of other well known valve structures combined with an actuator including, but not limited to, ball valves, butterfly valves, gate valves, globe valves, or flapper valves. Also, the "vent valve" may constitute a deforming member located at a flexible portion of the vent line 36 similar to the occluding device 102 shown in the embodiment of FIG. 4 and described below. Further, these alternate "vent valves" may be actuated by other well known actuating devices, such as pneumatic or hydraulic actuators, rather than by a solenoid. The spray pattern 70 has an initial pattern 72 and can be controlled to decrease the radius of the pattern defining an inner spray pattern 74 and increased to define an outer spray pattern 76. The outer spray pattern 76 and inner spray pattern 74 are achieved as described in greater detail herein below.

During the brewing cycle when the inlet solenoid 40 is closed or "off" the vent solenoid 52 can be controlled to a closed position thereby causing a narrowing or inner spray pattern 74. When the inlet solenoid 40 is opened, in other words the refill cycle is "on" the vent solenoid 52 can be controlled to a closed position to expand the pattern to the outer spray pattern 76. By alternating cycles of the inlet solenoid 40 open and closed and controllably altering the vent solenoid 52 open and closed the spray pattern 70 changes from an inner spray pattern 74 to an outer spray pattern 76. This alteration of the spray pattern 70 tends to create an oscillation, wave, or stirring action within the coffee grounds suspended in the water in the funnel 20.

Figure 2:
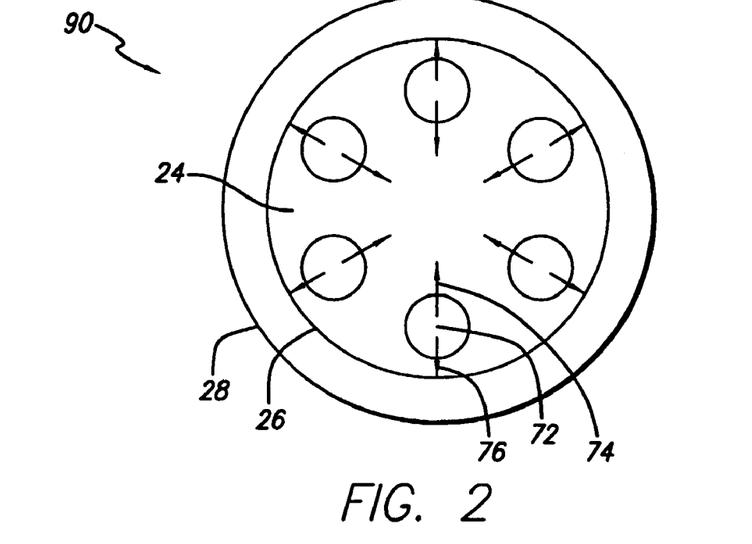
FIG. 2 is a diagrammatic illustration of a top plan view of a beverage brewing funnel taken along line 2—2 in FIG. 1 showing a spray pattern in the beverage brewing substance.
Figure 3:
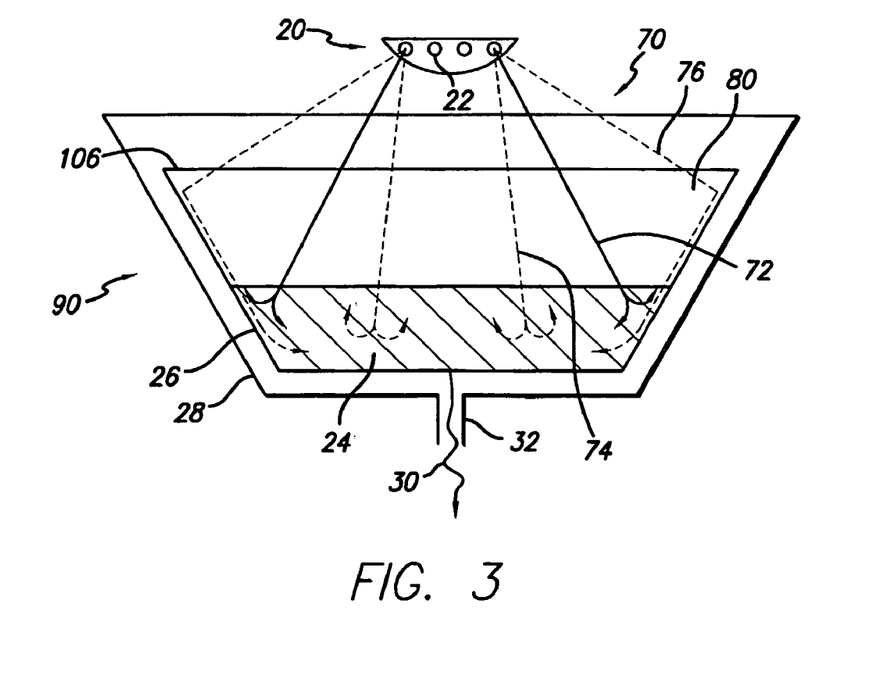
FIG. 3 is a diagrammatic illustration showing the variation in the spray pattern and the resultant agitation of beverage brewing substance caused thereby.

With reference to FIG. 2, a top plan view of infusion assembly 90 is shown in which the spray patterns 72, 74, 76 emitted from the spray head 20 are diagrammatically illustrated. As can be seen, the spray pattern tends to move radially inwardly and outwardly relative to the initial spray pattern 72. With further reference to FIG. 3, it can be seen that the direction of flow of the spray pattern tends to cause the turbulence or undulation within the coffee suspended in the water. In this regard, the system can be configured to cause the outer spray pattern 76 to spray along a wall 80 of the funnel and filter to wash the grounds thereon inwardly and to stir from the outer perimeter of the grounds suspended in the water.

As the pattern is changed from the outer spray pattern 76 to the initial spray pattern 72 the flow can create a wave like pattern to flow the grounds inwardly towards the center of the quantity of grounds suspended in the water. As the pattern continues to change to an inner spray pattern 74 the pattern tends to be a more downwardly flow thereby causing agitation in the grounds. The pattern will flow outwardly and inwardly as controlled by the controller 44 which operates the vent solenoid 52. The contraction and expansion of the spray patterns 72, 74, 76 tends to stir or move the particles in the ground coffee bed or beverage brewing substance 24.

By moving the beverage brewing substance 24 around in the volume of water in which it is suspended more contact can be made with the individual particles thereby facilitating driving out or rinsing more coffee solids from each of the particles. Additionally, the mixing of the water or infusing of the brewing substance is more uniform creating a more homogeneous resultant brewed beverage 30.

The operation of the present invention can be configured so that the changes in pattern are somewhat gradual thereby preventing sloshing or uncontrolled wave action within the funnel. This may be used so as to prevent spilling from the funnel. The gradual flow also helps to facilitate movement of the slurry of particles in the water. Alteration of the pattern preferably occurs several times throughout a beverage brewing cycle thereby helping to facilitate thorough mixing and agitation of the brewing substance.

The turbulence helps facilitate generating agitating action and circulating the coffee through the water. This exposes more coffee to more water, getting more water through the cell structure of each coffee ground or particle thereby extracting more coffee solids from each coffee particle. It is possible that the present invention may help reduce the quantity of brewing substance required to obtain a brewed beverage having desired flavor characteristics or profile. This is because the present invention tends to reduce over extraction of certain areas or clusters of ground coffee particles and prevents under extraction of other clusters of ground coffee particles.

Figure 4:
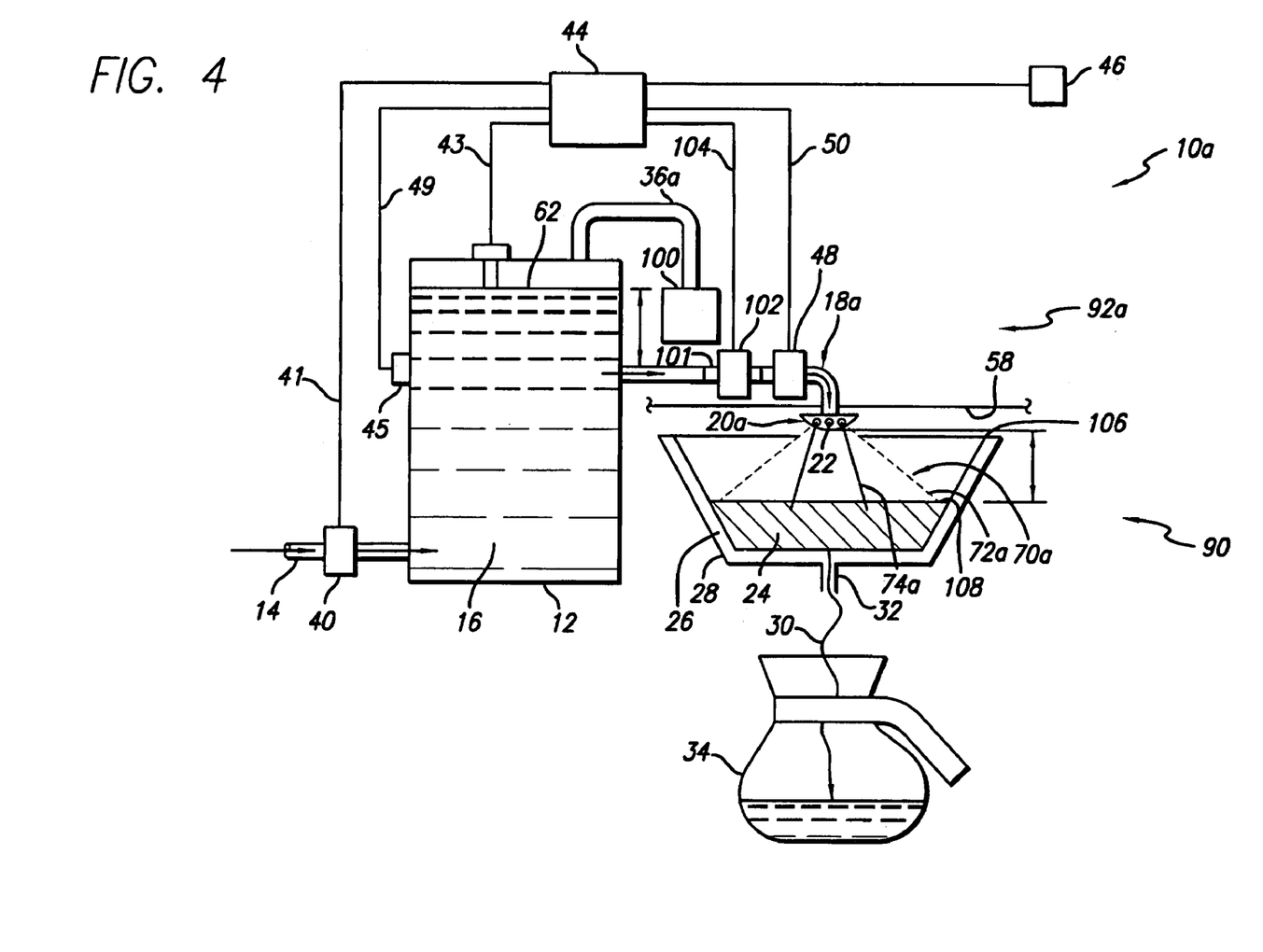
FIG. 4 is a partial fragmentary diagrammatic illustration similar to that as shown in FIG. 1, illustrating an alternate embodiment of the present disclosure.

It is anticipated that the teachings of the present invention could also be used with a gravity fed water system as well as the pressurized water system as shown in FIGS. 1 and 4. In this regard, prior art devices have been developed in which a basin is positioned above the reservoir to maintain a quantity of water to be used in the brewing process. Such an apparatus is shown generally in U.S. Pat. No. 5,025,714 issued Jun. 25, 1991 and U.S. Pat. No. 5,113,752 issued May 19, 1992, both of which are assigned to the assignee of the present invention. Further, additional gravity fed water systems are further illustrated in the embodiments of FIGS. 7–8 below.

In such apparatus, a basin is positioned generally above the reservoir and coupled to the reservoir by a feed tube. The feed tube delivers the inlet water to the reservoir. An inlet solenoid can be attached to the feed tube to control the inflow of water in the manner as shown in the present invention. As a result, the feed basin and feed tube configuration can be considered an equivalent of the pressurized feed line 14 and inlet solenoid 40.

Additionally, it is anticipated that the beverage brewing substance 24 shown in the figures might also be provided in the form of a pre-packaged pouch of coffee. In this regard, pre-packaged pouches of coffee have been used in brewing funnels 28 to replace the filter structure 26 (such as a metal mesh or a disposable paper filter) and brewing substance 24.

Such a pouch of coffee eliminates the need for individual filter papers 26 and measuring of the beverage brewing substance 24. By providing a pre-packaged, pre-measured pouch of coffee of which the pouch is a filter material, it is possible to further increase the consistency of the resultant brewed beverage. This is because the volume of ground coffee and type of filter can be controlled. However, it should be considered for purposes of the present invention such pre-packaged pouch of coffee are equivalents of open disposable filter papers and manually measured quantities of beverage brewing substance of coffee 24.

The present invention includes a beverage brewing substance apparatus 10 and an infusion assembly 90. The infusion assembly 90 is positioned relative to a portion of the brewing apparatus 10. Heated water 16 is retained in a reservoir 12. An inlet water line 14 communicates with the reservoir 12 for introducing water to the reservoir 12. An outlet line 18 communicates with the reservoir 12 and the infusion assembly 90 for delivering heated water 16 to the infusion assembly 90. A flow modifier 92 is provided and is operatively associated with the apparatus 10 for modifying the outlet flow of heated water flowing through the outlet line 18. The infusion assembly 90 includes the funnel 28, filter 26 for receiving a charge of beverage brewing substance 24. The flow modifier 92 as shown in FIG. 1 includes at least the vent line 36 and vent solenoid 52 and may preferably include inlet feed line 14 and inlet solenoid 40.

In use, in the embodiment as shown in FIG. 1, closing of the vent solenoid 52 prevents the flow of air through vent line 36. As a result, when the inlet solenoid 40 is opened pressurized water flows through the inlet feed line 14 into the reservoir 12. The only path through which the water can flow is through the outlet line 18. If the maximum capacity of the outlet line 18 is already met, the continued introduction of water through the feed line 14 may pressurize or compress the atmosphere in the upper portion 38 of the reservoir 12 and the vent line 36 communicating therewith. This will tend to pressurize the water flowing from the spray head 20 thereby increasing or expanding the radial dimension of the spray pattern producing outer spray pattern 76.

When the vent solenoid 52 is closed and the inlet solenoid 40 is closed, the outflow of water through the outlet line 18 will tend to decrease as the level of water in the reservoir 12 drops. As a result, there will be a gradual shift from the outer spray pattern 70 towards the inner spray pattern 74. The change in the spray pattern 70 from spray pattern 76 to spray pattern 74 tends to cause a movement of the coffee and liquid retained within the infusion assembly 90. In other words, the dispersion pattern can be altered while it is emitted from the fixed pattern of holes 22 in the spray head 20. The dispersion pattern will change as a result of the change in pressure of the water emitted from the spray head 20 or the rate of liquid flow at the spray head 20. The modification of the dispersion pattern tends to agitate the water and brewing substance 24 within assembly 90.

The embodiment as shown in FIG. 1 considers a method of brewing a beverage. Under this method, an infusion assembly 90 is provided for use with a beverage brewing apparatus 10. The infusion assembly 90 receives a charge of brewing substance 24 and is positioned relative to a spray head 20. A controller 44 is provided and is operated to open and close valves which communicate with a heated water reservoir 12 in response to the sensing of conductivity or absence of conductivity at probe 42. The method uses selectively modifying a water dispensing pattern 70 of water dispensed from the water distribution assembly for at least one of expanding and contracting the dispensing pattern 70 from the spray head 20. The method further includes operatively controlling the opening and closing of a vent solenoid 52 communicating with a vent line 36 attached to and communicating with the reservoir 12. The method also includes the step of controlling the inlet solenoid 40 to control the introduction of water through an inlet feed line 14.

Having described the embodiment of FIG. 1, we turn to the embodiment as shown in FIG. 4. Reference to portions of the illustration in FIG. 4 which are substantially similar to, the equivalent of, or identical to those shown in FIG. 1 will be referred to by the same reference number with the addition of an alphabetic suffix. For example, the beverage brewing apparatus is referred to as "10a" in the embodiment as shown in FIG. 4.

As shown in FIG. 4, a second embodiment of the apparatus 10a is shown. The apparatus 10a includes a vent line 36a which dispenses into an overflow container 100. Because of the orientation of the vent line 36a dispensing into the container 100 it is not desirable to provide the same flow modifier 92 as shown in FIG. 1. In this embodiment, an alternate flow modifier 92a is coupled to the outlet line 18a. The other components as described hereinabove in the present apparatus 10a are similar if not identical to those as shown and described in FIG. 1.

With reference to FIG. 4, the flow modifier 92a can be provided in a variety of forms. Similar to the flow modifier 92 of FIG. 1, the purpose of the flow modifier 92a of the embodiment of FIG. 4 is to regulate the flow rate of liquid within the outlet line 18a and at the spray head 20a. Outlet line 18a includes at least a portion formed of a flexible and resilient member such as plastic or silicone tubing 101. The tubing 101 extends through an occluding device 102 such as a gate or other devices. Such an occluding device 102 is connected to the controller 44 over line 104. The occluding device 102 operates to squeeze or partially occlude the flexible portion 101 of outlet line 18a. By partially occluding the tube 101, the spray pattern can be pulsed to narrow or draw in the spray pattern 70. This operating system does not tend to produce the outward directed spray pattern but, as described hereinbelow, adjustments can be made to achieve a desired result. While the flexible member 101 and occluding device are the preferred flow modifier for the embodiment of FIG. 4, it is contemplated that a variety of conventional valves and valve actuators of the type described above for FIG. 1 may be used to control the flow rate at the spray head 20a.

Since the alternate embodiment is shown in FIG. 4 does not generally produce the outer spray pattern 76 as shown in FIG. 1, the system has to be configured slightly differently. In the alternate embodiment 10a as shown in FIG. 4, the parameters of the spray head are adjusted so the initial spray pattern 72a is adjusted to contact the outer edge 108 of the filter 26. The adjustment is made so as to wash coffee grounds away from the filter while not collapsing an upper rim 106 of the paper filter 26. In this configuration, when the occluding device 102 at least partially occludes the outlet line 18a, the pattern 70a tends to be drawn inwardly. As such the flow modifier 92a of the alternate embodiment as shown in FIG. 4 produces turbulence or agitating action of the ground beverage brewing substance 24 in the water. Once the occluding device 102 releases the flexible portion 101 of the outlet line 18a, the pattern flows from the inner pattern 74a to the initial or outer pattern 72a.

As noted above, the remaining features, structures and functions of the alternate embodiment as shown in FIG. 4 are generally the same, identical or equivalent to those as shown and described hereinabove with regard to FIG. 1. In a like manner, the operation of the method of the alternate embodiment is similar, equivalent or identical to that as described hereinabove with regard to FIG. 1 with the exception of the absence of the vent solenoid 52. In this regard, the occluding device 102 is operated in the manner of the vent solenoid 52. As such, the flow modifier 92 as described in FIG. 1 is similar, equivalent or identical to the flow modifier of 92a as shown and described with reference to FIG. 4.

Figure 5:
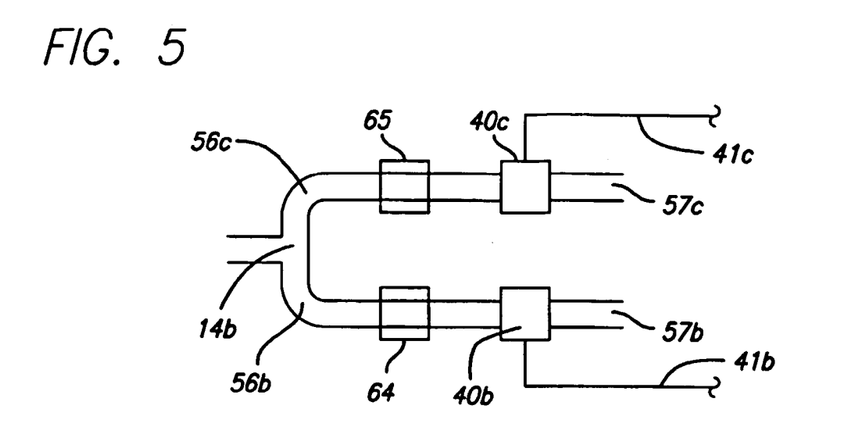
FIGS. 5–8 show additional embodiments of the disclosed variable flow spray system.

FIG. 5 illustrates yet another embodiment of the invention in which the inlet 14 and inlet solenoid 40 of FIG. 4 are replaced with an alternate inlet arrangement 14b and inlet solenoids 40b and 40c. Except for the other differing features noted below, the embodiment of FIG. 5 is generally the same as that of FIG. 4 in its other aspects. Inlet 14b is split into a pair of pressurized inlet lines 56b and 56c which are preferably equipped with flow restrictors 64 and 65. The flow restrictors 64 and 65 are calibrated and selected to provide a first lower flow rate at the inlet 57c and a second higher flow rate at the inlet 57b. Control lines 41b and 41c are provided between the controller 44 and inlet solenoids 40b and 40c to control the pressure at inlets 57b and 57c. By controlling the flow rate at the inlets 57b and 57c, the pressure within the closed reservoir and the depth or height of the head 68 within the reservoir 16 can be controlled. In this way, a variety of flow rates and spray patterns can be generated to ensure thorough mixing of the brewed substance.

In the embodiment of FIG. 5, the reservoir is preferably a closed system in which the only outlet is outlet 18. Accordingly, overflow container 100 of FIG. 4 must be sealed from the atmosphere. Preferably, in the embodiment of FIG. 5, the occluding device 102 shown in the embodiment of FIG. 4 may be eliminated since the multiple control valves are sufficient to vary the flow rate.

In operation, the flow rate at the spray head 20a is controlled by sending signals from controller 44 to inlet solenoids 40b and 40c which add pressurized liquid at inlets 57b and 57c. Upon initiation of the brewing cycle, liquid flow to the spray head 22 at a first, higher flow rate upon actuation of inlet solenoid 40c. This results in a larger, outer spray pattern. After a predetermined time period, inlet solenoid 40c is closed and valve 40b is open to provide liquid at a second lower pressure to the reservoir. This causes a lower flow rate at spray head 22 and an inner spray pattern. Optionally, both valves 40b and 40c may be opened or closed at the same time to generate an even larger outer spray pattern or even smaller spray pattern, respectively. By opening and closing valves 40b, 40c alone and in combination, superior control of the spray patterns throughout a brewing cycle can be achieved.

Figure 6:
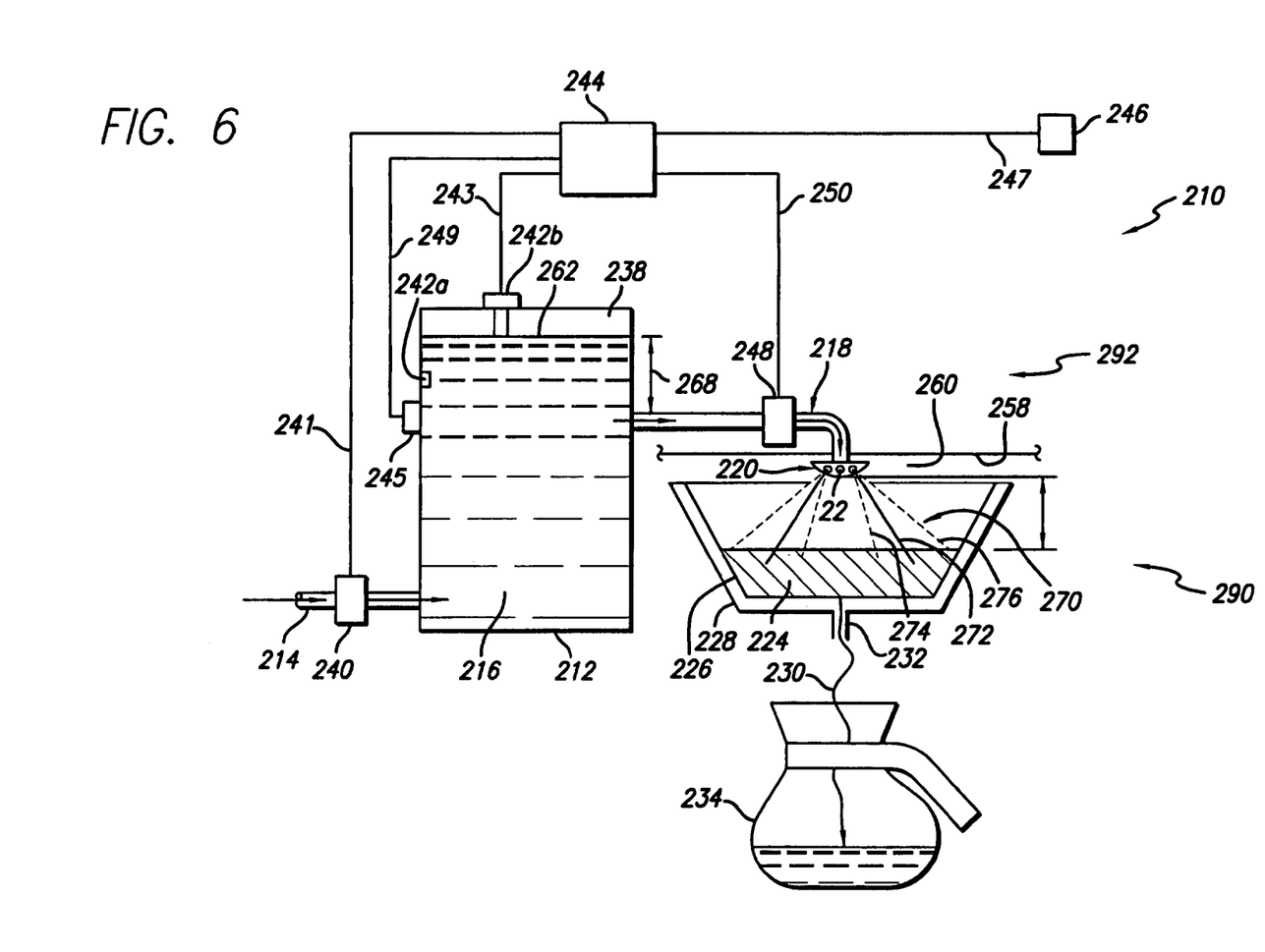

Having described the embodiments of FIGS. 1, 4 and 5, we turn to the embodiment of FIG. 6, which is most similar to FIG. 1. Reference to portions of the illustration of FIG. 6 which are substantially similar to the equivalent of, or identical to those shown in FIG. 1 will be referred to by the same reference number with the addition of the number 2 as a prefix. For example, the beverage brewing apparatus is referred to as "210" in the embodiment of FIG. 6.

In embodiment of the disclosure shown in FIG. 6, the flow modifier 292 includes at least two water level probes or sensors 242a and 242b, as well as inlet line 214. Similar to the embodiment of FIG. 1, the sensor 242a is set at a refill liquid level within the reservoir 212. At this level, the sensor 242a no longer contacts liquid 216 in the reservoir 212 so that inlet solenoid 240 is caused by controller 244 to be opened. This causes pressurized liquid to enter the reservoir and fill it until the water level 262 reaches the second sensor 242b which causes a signal to be generated and returned to control 244 to cause the inlet solenoid 240 to move to a closed position. The sensors 242a and 242b and reservoir 212 and inlet 214 are calibrated and dimensioned so that the opening of inlet 214 during the brewing cycle causes the water level in the reservoir to rise until it reaches the level of sensor 242b. Preferably, the vent 36 and vent solenoid 52 is eliminated in the embodiment of FIG. 6, although they may be retained if greater flow control is desired.

In the embodiment of FIG. 6, the spray pattern is altered by repeatedly refilling the reservoir during a brewing cycle so that a high flow rate with associated outer spray pattern occurs when the head 268 is at a maximum depth and the valve 240 is open thereby supplying water under pressure to the reservoir 212. The minimum flow rate with associated inner spray pattern occurs when the head 268 is at its minimum depth just prior to the opening of the inlet solenoid 240. The embodiment of FIG. 6 offers the advantage of requiring relatively inexpensive components for constructing a flow modifier since inexpensive sensors may be used instead of relatively more expensive controlled valves.

Figure 7:
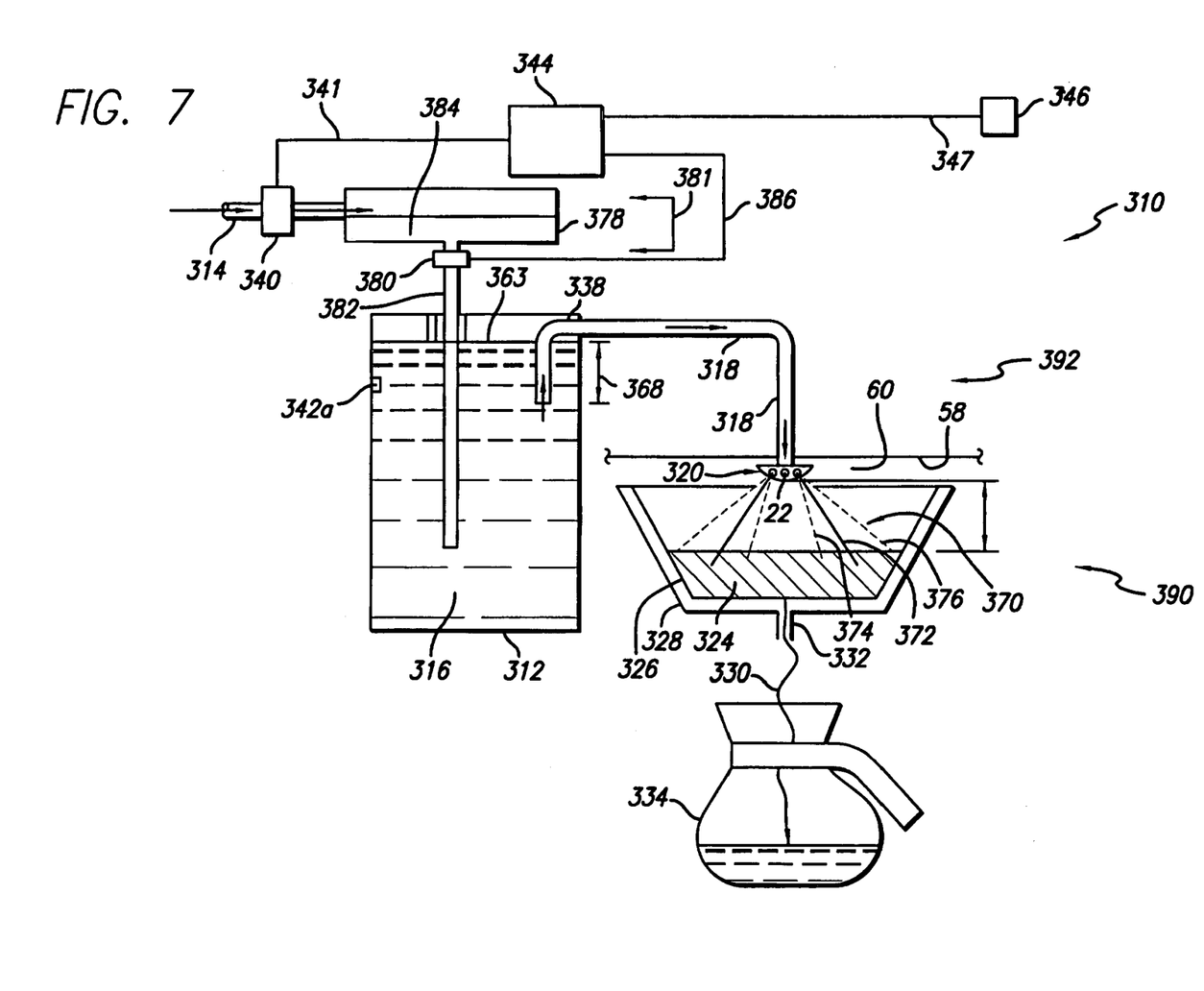

The manner of operation of the embodiment of FIG. 7 is similar to that of FIG. 6 in that the flow modification is due to repeated addition of pressurized liquid and recharging of a water head 368 during a single brewing cycle. The embodiment of FIG. 7 differs from that of FIG. 6 chiefly in that it utilizes a gravity fed water system in which a basin 378 is positioned above the reservoir 312 to maintain a quantity of water to be used in the brewing cycle. The basin 378 has liquid inlet 314 and an inlet solenoid 340 connected by control line 341 to control 344. A control valve 380 is placed along the feed tube 382 which supplies pressurized water to liquid reservoir 312. The control valve 380 is operably connected to controller 344 by control line 386. The depth 385 of liquid 384 in the basin 378 creates a basin head 381 that supplies water to the reservoir under pressure. Outlet conduit 318 is preferably sized and dimensioned to be immersed within the reservoir to form a "siphon type" outlet, which eliminates the need for a valve of the outlet conduit 318.

In operation, upon initiation of a brewing cycle, inlet solenoid 340 is opened and a quantity of liquid is added to basin 378. When control valve 380 is opened, it causes the liquid level to rise within reservoir 312 and to flow through outlet line 318. The flow rate through feed tube 382 is greater than reservoir outlet line 318 so that a reservoir head 368 is formed within the reservoir 312. The addition of pressurized water and deepening of the reservoir head 368 causes increased flow through the spray head 320. After a predetermined quantity of liquid is allowed to flow into the reservoir 312, control valve 380 is shut and liquid continues to flow from reservoir 312. As the flow continues, the depth of head 368 is decreased so that the flow rate at the spray head 320 is diminished and creates an inner spray pattern 374.

After a predetermined volume of liquid flows through outlet line 318, the control valve 380 is again opened and pressurized water enters the reservoir 312. The opening of valve 380 adds pressurized water to the reservoir, increases the pressure within the reservoir, and causes the water level to rise thereby increasing the water depth and head 368. This in turn causes increased flow through the outlet line 318 and increased liquid flow at spray head 320 which again forms an outer spray pattern 376. This cycle is preferably continued several times during a single brewing cycle to facilitate mixture of the brewing substance.

Figure 8:
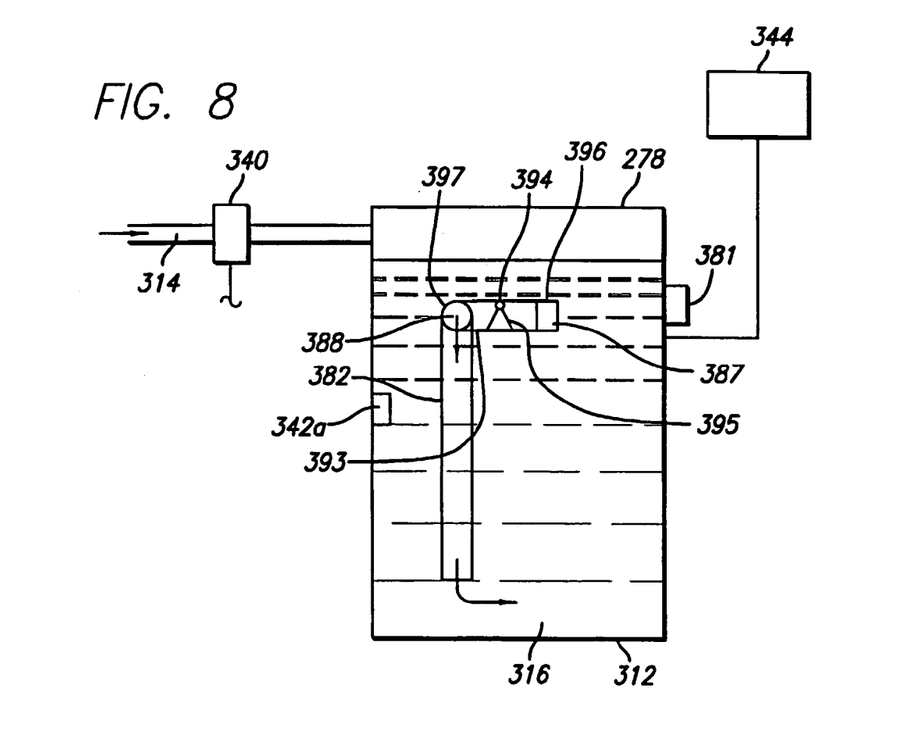

FIG. 8 illustrates one preferred valve for use with the basin 378 shown in FIG. 7. Often space is at a premium between the basin and reservoir in many brewing apparatus so that an external valve 380 such as shown in FIG. 7 is not desirable. The valve illustrated in FIG. 8 is particularly well suited for such applications. The valve assembly is of a pivot type which includes an actuator 387 and a plunger 388 which cover the aperature 393 of the feed tube 382. The lever 394 rests on and is pivotably coupled to pivot support 395. A first end 396 of lever 394 is contacted by actuator 387 to cause lever first end 396 to rise and lever second end 397 to be lowered thereby causing plunger 388 to cover and seal aperature 393 of tube 382. When actuator 387 is retracted, second end 397 of lever 396 no longer covers aperature 393 and liquid may flow through tube 382 to the reservoir. Preferably, actuator 387 is operably linked to lever first end 396 so that retraction of the actuator 387 pulls lever first end 396 downwardly to drive lever second end 397 and plunger 388 upward. Alternatively, plunger may be made of a bouyant material and the lever first end 396 may be merely make contact with first and 396, rather than being linked to it. In this way, plunger 388 will float upwardly when not contacted by actuator 388 and lever 394 respectively.

The applicant has provided description and figures which are intended as an illustration of certain embodiments of the invention, and are not intended to be construed as containing or implying limitation of the invention to those embodiments. It will be appreciated that, although applicant has described various aspects of the invention with respect to specific embodiments, various alternatives and modifications will be apparent from the present disclosure which are within the spirit and scope of the present invention as set forth in the following claims.

The invention claimed is:

1. An apparatus for brewing a beverage comprising:
   a resevoir capable of being pressurized;
   a liquid conduit for supplying a brewing liquid from the resevoir;
   a liquid permeable container for retaining a brewing substance and allowing the brewed liquid to pass through;
   a spray member for delivering the brewing liquid from the liquid conduit to a brewing substance, the spray member discharging the brewing liquid into the liquid permeable container;
   a controllable liquid flow modifier for varying the flow of liquid at the spray member to alter the discharge of the liquid from at least a first spray pattern to at least a second spray pattern; and
   a controller operably connected to the liquid flow modifier for causing the liquid flow modifier to vary the liquid flow at the spray member.

2. The apparatus of claim 1 wherein the apparatus further comprises a liquid reservoir operably connected to the liquid conduit, the liquid reservoir having a pressure relief vent for altering the pressure within the liquid reservoir.

3. The apparatus of claim 2 wherein the liquid flow modifier includes a controllable pressure relief vent valve for controlling the air flow through the pressure relief vent.

4. The apparatus of claim 3 further comprising a pressurized inlet operably connected to the controllable liquid flow modifier for selectively supplying liquid at pressure to the liquid reservoir.

5. The apparatus of claim 4 wherein the controllable liquid flow modifier also includes the pressurized inlet, and wherein the pressurized inlet is moved to an at least substantially closed position and the vent valve is moved to an at least substantially open position to reduce the pressure within the liquid reservoir, liquid conduit and at the spray member to reduce the flow rate and cause a diminished spray pattern.

6. The apparatus of claim 4 wherein the controllable liquid flow modifier also includes the pressurized inlet, and wherein the pressurized inlet is moved to an at least substantially opened position in combination, with the vent valve being moved to at least a substantially closed position to cause an increased pressure within the liquid reservoir, liquid conduit and at the spray member to increase the flow rate at the spray member and cause an enlarged spray pattern.

7. The apparatus of claim 1 wherein said liquid flow modifier is a liquid conduit valve for varying the flow of the liquid within the liquid conduit.

8. The apparatus of claim 1 wherein the liquid conduit valve includes an occluding member and a flexible portion of the brewing liquid conduit, the occluding member being operably associated with the flexible portion to selectively deform the flexible portion of the conduit to reduce the liquid flow rate at the spray member.

9. The apparatus of claim 1 further comprises a liquid reservoir, a liquid inlet for introducing water to the reservoir and wherein the liquid flow modifier includes a first water level sensor for detecting a first liquid head level, the water inlet, and a second water level sensor for detecting a second liquid head level within the reservoir for causing refilling of the reservoir, the first water level sensor and the second water level sensor being positioned to cause repeated refilling of the reservoir during a brewing cycle and thereby repeatedly varying the flow at the spray member to alter the discharge of liquid repeatedly from the at least a first spray pattern to at least a second spray pattern.

10. A method for brewing a beverage comprising the steps of:
    placing a brewing substance in a liquid permeable container;
    supplying a brewing liquid at a first flow rate to a spray member located proximate to the liquid permeable container;
    spraying the brewing liquid into the liquid permeable container containing the brewing substance in at least a first spray pattern;
    generating a control signal for altering the flow rate of the brewing liquid at the spray member to at least a second flow rate;
    altering the flow rate of the liquid at the spray member to a second flow rate in response to the control signal;
    spraying the liquid into the liquid permeable container in at least a second spray pattern in response to the second flow rate to mix the brewing substance with the brewing liquid within the liquid permeable container; and
    passing the brewed liquid through the liquid permeable container into a receptacle.

11. The method according to claim 10 wherein the mixing of the brewing substance includes repeatedly altering the flow rate between at first flow rate and a second flow rate.

12. The method according to claim 10 wherein the step of spraying the liquid into the liquid permeable container includes the step of increasing the flow rate at the spray member so that the second spray pattern has a larger circumference than the first spray pattern.

13. An apparatus for a beverage comprising:
a resevoir capable of being pressurized;
a liquid spraying means for spraying a brewing liquid from the reservoir into a brewing substance;
a liquid supply means for supplying liquid to the liquid spraying means;
a container means for retaining a brewing substance and allowing a brewed liquid to pass through;
a control means for generating a signal to change the flow of the brewing liquid at the liquid spraying means; and
flow modifier means for varying the flow of the liquid at the liquid spraying means between at least a first flow associated with a first spray pattern and a second flow associated with a second spray pattern to facilitate mixing of the brewing liquid and brewing substance within the container means during the brewing process.

14. An apparatus for brewing a beverage comprising:
a reservoir capable of being pressurized for a brewing liquid, the reservoir having an inlet and an outlet;
an inlet valve for controlling the flow of brewing liquid into the reservoir;
an outlet valve for controlling the flow of brewing liquid exiting the reservoir;
a liquid conduit for supplying a brewing liquid from the reservoir outlet;
a liquid permeable container for retaining a brewing substance and allowing the brewed liquid to pass through;
a spray member for delivering the brewing liquid from the liquid conduit to the brewing substance, the spray member discharging the brewing liquid into the liquid permeable container;
a controller operably connected to the inlet valve and outlet valve for causing the brewing liquid flow at the spray member to pulse.

15. The apparatus according to claim 14 wherein
the controller includes an occluding device in the liquid conduit for repeatedly partially occluding the liquid conduit and causing the brewing liquid flow at the spray member to pulse.

16. The apparatus according to claim 14 wherein
the controller approximates the volume of water dispensed through outlet valve and opens and closes the inlet valve and outlet valve for dispensing a desired amount of the brewing liquid from the reservoir to the beverage brewing substance.

17. An apparatus for brewing a beverage comprising:
a reservoir for a brewing liquid, the reservoir having an inlet, an outlet and a vent line;
an inlet valve at the inlet for controlling the flow of brewing liquid into the reservoir;
an outlet valve at the outlet for controlling the flow of brewing liquid exiting the reservoir;
an adjustable vent valve operably connected to the vent line, the adjustable vent valve adjusting the flow of gas through the vent line and controlling the pressure within the reservoir;
a liquid conduit for supplying a brewing liquid from the reservoir outlet;
a liquid permeable container for retaining a brewing substance and allowing the brewed liquid to pass through;
a spray member for delivering the brewing liquid from the liquid conduit to the brewing substance, the spray member discharging the brewing liquid into the liquid permeable container;
a controller operably connected to the vent valve for causing the brewing liquid flow at the spray member to increase or decrease.

18. The apparatus according to claim 17 wherein the spray member is operable to provide a plurality of spray patterns.

19. The apparatus according to claim 18 wherein the spray patterns include an initial spray pattern, an inner spray pattern and an outer spray pattern.

20. The apparatus according to claim 19 wherein the controller is operable to increase or decrease the flow at the spray member to expand the pattern to the outer spray pattern.

21. The apparatus according to claim 19 wherein the controller is operable to close the vent valve to expand the pattern to the outer spray pattern.

22. An apparatus for brewing a beverage comprising:
a reservoir for a brewing liquid, the reservoir having an inlet, an outlet and a vent line;
an inlet valve at the inlet for controlling the flow of brewing liquid into the reservoir;
an outlet valve at the outlet for controlling the flow of brewing liquid exiting the reservoir;
an adjustable vent valve operably connected to the vent line, the adjustable vent valve adjusting the flow of gas through the vent line and controlling the pressure within the reservoir;
a liquid conduit for supplying a brewing liquid from the reservoir outlet;
a liquid permeable container for retaining a brewing substance and allowing the brewed liquid to pass through;
a spray member for delivering the brewing liquid from the liquid conduit to the brewing substance, the spray member discharging the brewing permeable container;
a controller operably connected to the adjustable vent valve and inlet valve for causing the brewing liquid flow at the spray member to increase or decrease.

23. The apparatus according to claim 22 wherein the spray member is operable to provide a plurality of spray patterns.

24. The apparatus according to claim 23 wherein the spray patterns include an initial spray pattern, an inner spray pattern and an outer spray pattern.

25. The apparatus according to claim 24 wherein the controller is operable to increase or decrease the flow at the spray member to expand the pattern to the outer spray pattern.

26. An apparatus for brewing a beverage comprising:
a reservoir for a brewing liquid, the reservoir having an inlet, an outlet and a vent line;
an inlet valve at the inlet for controlling the flow of brewing liquid into the reservoir;
an outlet valve at the outlet for controlling the flow of brewing liquid exiting the reservoir;
an adjustable vent valve operably connected to the vent line, the adjustable vent valve adjusting the flow of gas through the vent line and controlling the pressure within the reservoir;
a liquid conduit for supplying a brewing liquid from the reservoir outlet;
a liquid permeable container for retaining a brewing substance and allowing the brewed liquid to pass through;
a spray member for delivering the brewing liquid from the liquid conduit to the brewing substance, the spray member discharging the brewing liquid into the liquid permeable container;

a controller operably connected to the adjustable vent valve, inlet valve and outlet valve for causing the brewing liquid flow at the spray member to increase or decrease.

27. The apparatus according to claim 26 wherein the a liquid permeable container is a filter and the controller adjusts the discharge of liquid to wash brewing substance away from the filter while not collapsing an upper rim of the filter.

28. The apparatus according to claim 27 wherein the controller varies the flow at the spray member to alter the discharge of liquid repeatedly whereby the brewing substance is agitated.

29. The apparatus according to claim 28 wherein the controller varies the flow at the spray member to alter the discharge of liquid repeatedly whereby the brewing substance is agitated.

30. The apparatus according to claim 26 wherein the level of the brewing liquid in the reservoir is controllable to vary from a maximum level above the outlet to a level at the outlet.

31. The apparatus according to claim 30 wherein the controller varies the flow at the spray member to achieve an outer spray pattern by adjusting level of the brewing liquid to the maximum level above the outlet and opening the inlet valve.

32. An apparatus for brewing a beverage comprising:
a reservoir for a brewing liquid, the reservoir having a first inlet, a second inlet, an outlet and a vent line;
a first inlet valve at the first inlet for controlling the flow of brewing liquid into the reservoir;
a second inlet valve at the second inlet for controlling the flow of brewing liquid into the reservoir;
an outlet valve at the outlet for controlling the flow of brewing liquid exiting the reservoir;
an adjustable vent valve operably connected to the vent line, the adjustable vent valve adjusting the flow of gas through the vent line and controlling the pressure within the reservoir;
a liquid conduit for supplying a brewing liquid from the reservoir outlet;
a liquid permeable container for retaining a brewing substance and allowing the brewed liquid to pass through;
a spray member for delivering the brewing liquid from the liquid conduit to the brewing substance, the spray member discharging the brewing permeable container;
a controller operably connected to the adjustable vent valve, first inlet valve, second inlet valve and outlet valve for causing the brewing liquid flow at the spray member to increase or decrease.

33. The apparatus according to claim 32 wherein the controller varies the flow at the spray member by adjusting the first and second inlet valves to repeatedly alter the discharge of liquid from the spray member.

* * * * *